United States Patent [19]
Anzai et al.

[11] Patent Number: 6,115,160
[45] Date of Patent: Sep. 5, 2000

[54] INFRARED TRANSCEIVER HAVING A MOVABLE TRANSMITTER SHUTTER

[75] Inventors: Masato Anzai, Machida; Atsuhisa Naitoh, Ebina; Yoshinari Toyosato, Kawasaki, all of Japan

[73] Assignee: International Business Machines Corporation, Armonk, N.Y.

[21] Appl. No.: 08/545,284

[22] Filed: Oct. 12, 1995

[30] Foreign Application Priority Data

Nov. 15, 1994 [JP] Japan ..................................... 6-280225

[51] Int. Cl.[7] .................................................. H04B 10/00
[52] U.S. Cl. .......................................... 359/152; 359/159
[58] Field of Search .................................... 345/158, 169, 345/184; 359/159, 163, 152, 172; 455/151.2; 385/19; 362/321, 323, 322, 235, 248, 280, 581, 13, 14, 319, 320; 361/683

[56] References Cited

U.S. PATENT DOCUMENTS

| | | | |
|---|---|---|---|
| 4,496,946 | 1/1985 | Pera | 345/207 |
| 5,646,761 | 7/1997 | Medved et al. | 359/172 |
| 5,664,231 | 9/1997 | Postman et al. | 395/893 |
| 5,764,823 | 6/1998 | Shapanus et al. | 385/19 |

FOREIGN PATENT DOCUMENTS

| | | | |
|---|---|---|---|
| 62-07232 | 1/1987 | Japan . | |
| 62-73650 | 12/1987 | Japan . | |
| 2-8061 | 1/1990 | Japan | H01L 31/0232 |
| 3-2753 | 1/1991 | Japan . | |
| 0435235 | 2/1992 | Japan . | |

*Primary Examiner*—Eddie P. Chan
*Assistant Examiner*—Hong Kim
*Attorney, Agent, or Firm*—John D. Flynn; Stephen T. Keohane

[57] ABSTRACT

A plurality of wireless data output mechanisms (LEDs) are loaded at different angles to each other into a wireless communication apparatus, and a movable shutter for selecting at least one of the LEDs is located in front of the LEDs. The shutter has an output hole that is so formed that the selection of an arbitrary LED is possible, and as the shutter is shifted to shield unnecessary LEDs, it is possible to select only a desired LED. To select all the LEDs, the shutter is moved to a position where it does not shield any of the LEDs. With this arrangement, the direction for wireless communication can be easily set and the directivity of communication can be improved without reducing the light emission output.

14 Claims, 9 Drawing Sheets

INFRARED TRANSCEIVER HAVING A MOVABLE TRANSMITTER SHUTTER

FIELD OF THE INVENTION

The present invention relates to a wireless communication apparatus that can perform wireless communication across a broad range.

BACKGROUND OF THE INVENTION

An infrared wireless communication apparatus is known that is incorporated into a computer system, such as a personal computer (PC), or that is an expansion apparatus having the form of a PC card. Such an infrared wireless communication apparatus generally employs an Light Emitting Diode (LED) as a data output mechanism for the transmission of wireless data. Because of technical restrictions, the directivity of the LED is limited (the range of a communication area is conical and has an approximate span of only +/−15°), so that the wireless data communication angle of a conventional wireless communication apparatus is limited to a certain range. A conventional technique will now be explained while referring to the accompanying drawings. An example is shown in FIG. 5 of a wireless communication apparatus into which only one LED is loaded, and in FIG. 6 is shown an example of a wireless communication apparatus into which two LEDs are loaded. As is shown in these diagrams, since the conventional wireless communication apparatuses have one or more LEDs loaded and secured that face in a single direction, a directivity of only +/−15° at most is obtained. Therefore, the LED that serves as a data transmitting portion must be directed exactly toward a communication partner, and a computer system, such as a PC, must be moved in order to adjust the direction. Further, although a method for using a lens to extend the communication range has been studied, the communication distance is reduced because the light emission output is attenuated.

OBJECTS OF THE INVENTION

It is one object of the present invention to provide a wireless communication apparatus in which a communication direction can be easily set without requiring the moving of a computer system, and that can perform communication across a broad range without the attenuation of the data that are output.

SUMMARY OF THE PRESENT INVENTION

According to the present invention, a plurality of wireless data output mechanisms (LEDs) are loaded into a wireless communication apparatus at different angles to each other, and a movable shutter that selects at least one LED is provided in front of the LEDs. An output hole is formed in the shutter to facilitate the selection of an arbitrary LED. As the shutter is shifted so that it shields unnecessary LEDs, it is possible to select only the LED that is desired. To select all the LEDs, the shutter is moved to a position where it does not shield any of the LEDs.

With the structure of the present invention, the direction for wireless communication can be easily set, and the directivity for communication can be improved without reducing the light emission output. As the present invention can be realized with a comparatively simple structure, changes in the design of hardware and of software can be kept to the minimum.

DESCRIPTION OF THE PREFERRED EMBODIMENT(S)

For convenience sake, a PC card will be employed for the following description of the structure and the processing of a wireless communication apparatus according to the present invention. Another embodiment will be explained later.

Figure 1:
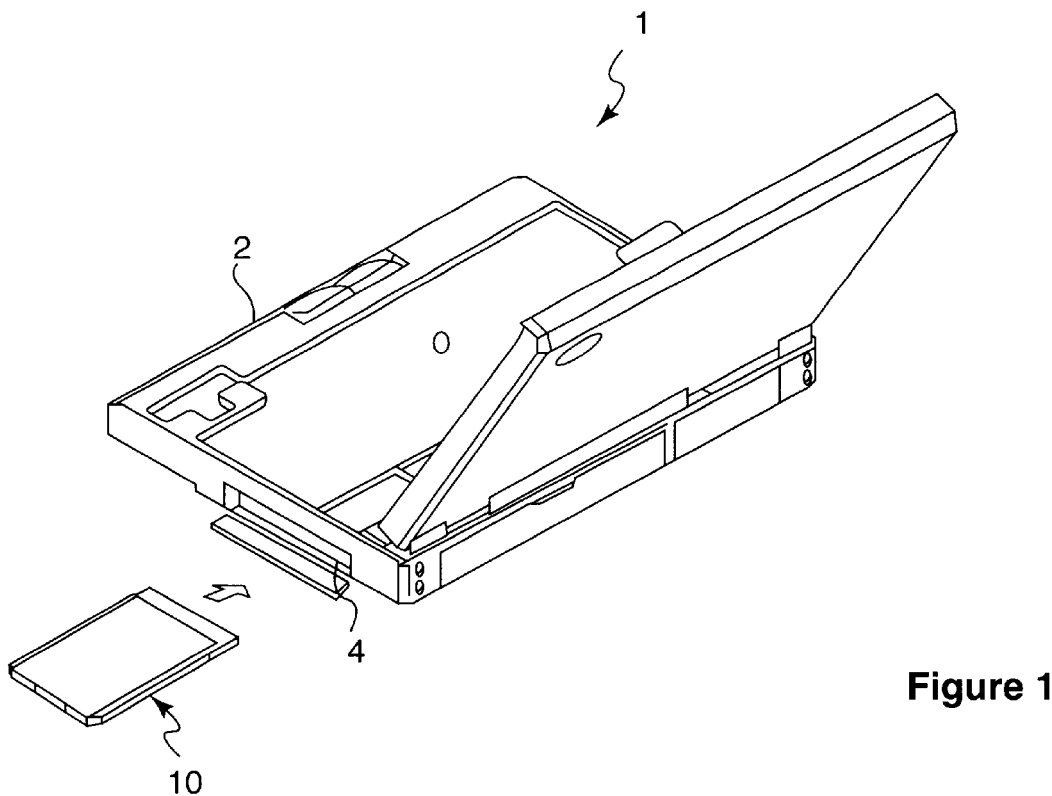
FIG. 1 is a diagram illustrating a computer system for carrying out the present invention.

FIG. 1 is a diagram illustrating the entire outline of a computer system 1 for carrying out the present invention. A case 2 of the computer system 1 is preferably a portable PC, as shown in FIG. 1, but may also be a desktop or other type of PC, a printer, a facsimile machine, or a communication controller. Details such as a keyboard and a display device are not shown in FIG. 1 as they do not directly relate to the present invention. A PC card 10, which is detachable, is inserted into a slot 4 on the side of the case 2 when it is in use. The slot 4 is arbitrarily positioned and may be located on the rear side of the PC. The specifications for the PC card 10 preferably conform to the established Personal Computer Memory Card International Association (PCMCIA) or Japanese Electronics Development Association (JEIDA) standards.

Figure 2:
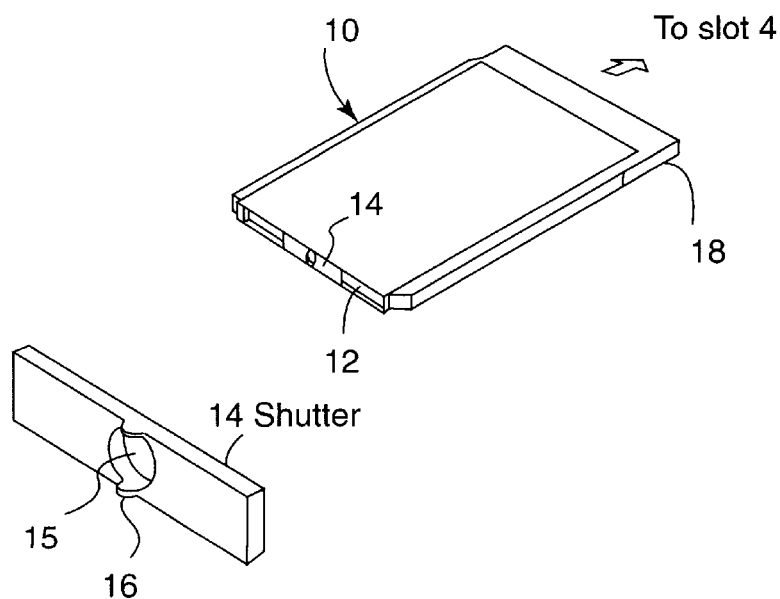
FIG. 2 is a diagram showing the outline of a PC card 10, and an enlarged diagram showing a shutter 14.

FIG. 2 is a diagram showing the outline of the PC card 10 and an enlarged diagram of a shutter 14. Since an infrared ray that represents wireless data is one type of light, its transmittance for a transparent obstacle is high. As a filter 12 is transparent, infrared data is transmitted and exchanged through the filter 12. On the other hand, the movable shutter 14, which is located in front of the filter 12, is not transparent and cuts off the infrared data. The infrared data is therefore exchanged only through an output hole 15 that is formed in the center of the shutter 14, or through a portion that is not shielded by the shutter 14 (both portions are included in the filter). The shutter 14 of the present invention is designed so as to be slid manually from side to side. A knob 16 may therefore be provided at an optional position on the shutter 14 for easier manipulation. A connector 18 is employed to transfer data between the system 2 and the PC card 10. When the connector 18 conforms to PCMCIA standards, it usually has 68 signal pins.

Figure 3:
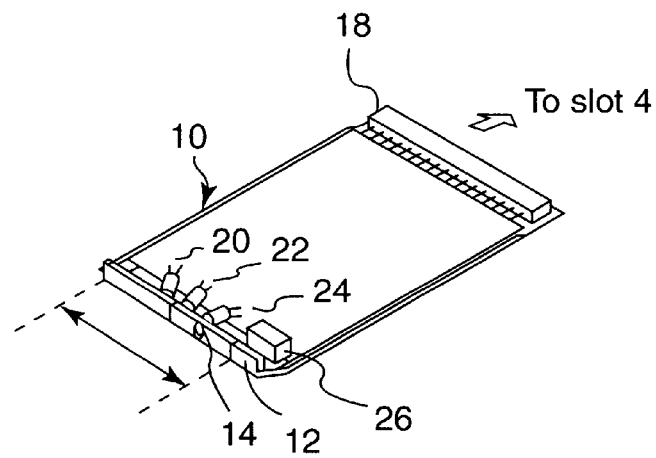
FIG. 3 is a diagram illustrating the internal structure of the PC card 10.
Figure 5:
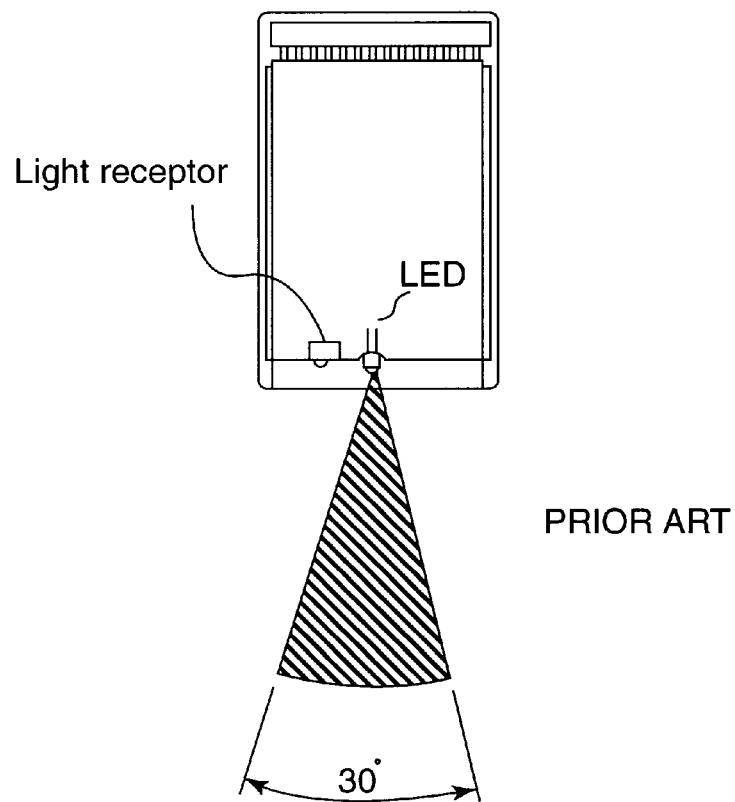
FIG. 5 is a diagram illustrating a conventional wireless communication apparatus.

FIG. 3 is a diagram illustrating the internal structure of the PC card 10. Since the detailed circuit structure that does not directly relate to the present invention is identical to that of a conventional wireless communication apparatus, it will not be represented (only the internal function block will be illustrated later in FIG. 4). Although three LEDs (wireless data output mechanisms) 20, 22, and 24, and one light receptor 26 are mounted in the PC card 10 in FIG. 3, the number of the LEDs and the receptors is arbitrary.

As is apparent from FIG. 3, according to the present invention, the three LEDs 20, 22 and 24 are installed in the PC card 10 at different angles to each other relative to the filter 12 on the output side. The angle for the installation is optional, but a value for the angle must be selected that will provide the maximum communication range. For example, because of current LED technical restrictions, the directivity of an LED is approximately +/−15° and the communication range is limited to approximately 30°. In this embodiment, therefore, the three LEDs 20, 22, and 24 are arranged at an angle of about 30° to each other to ensure that a maximum communication range of 90° will be covered. The movable shutter 14 is located at the front face of the filter 12 to enable the selection of a desired LED. The movement of the shutter 14 is limited to a certain range wherein shielding of the light receptor 26 is not possible in order to eliminate the chance that the shutter 14 will shield the light receptor 26 and prevent infrared data from being received. During the transmission of data, therefore, the constant reception of infrared data is ensured. The mode where an arbitrary LED is selected by shifting the shutter 14 will be explained later while referring to FIGS. 7 through 11.

Figure 4:
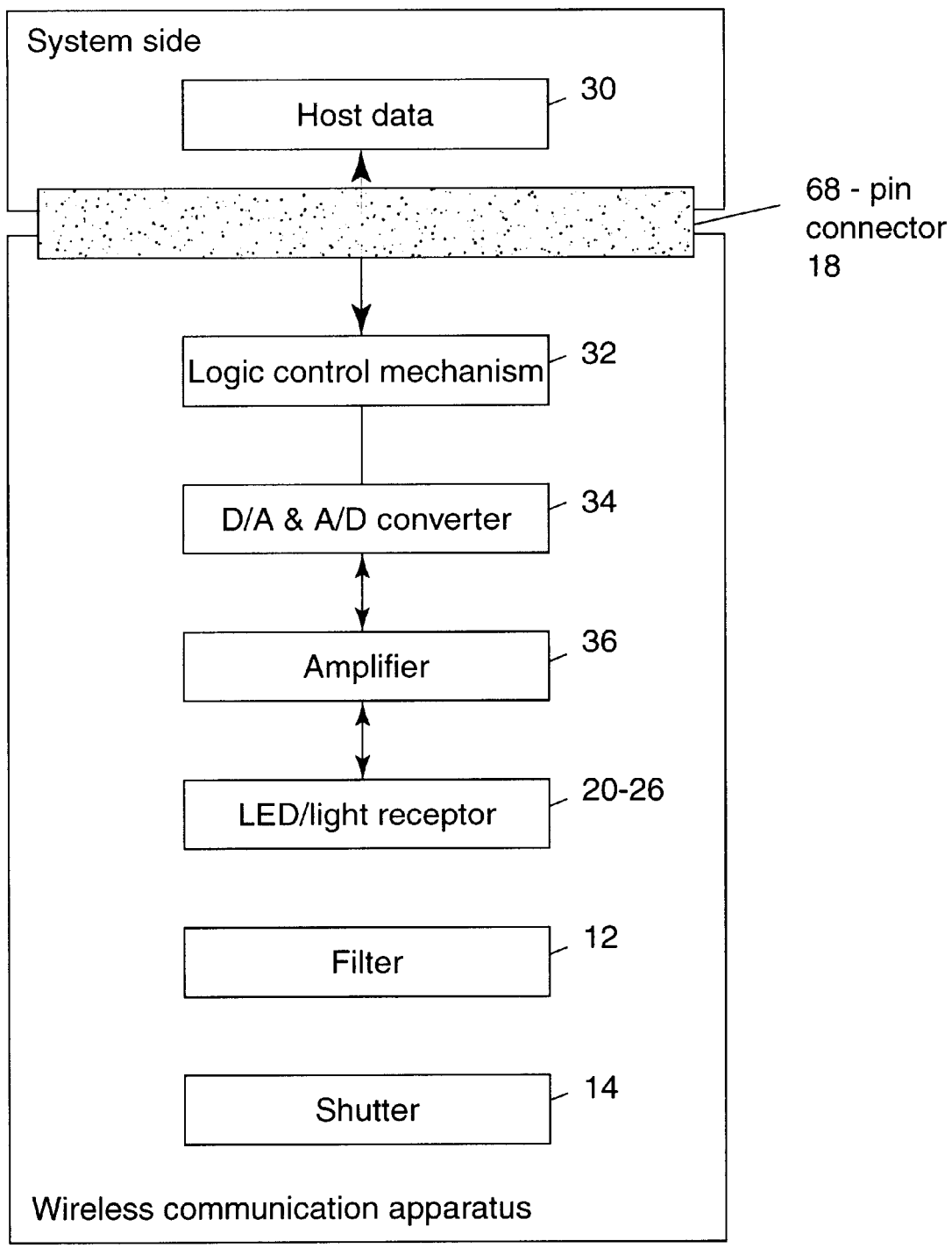
FIG. 4 is a diagram showing an internal function block of the PC card 10.
Figure 6:
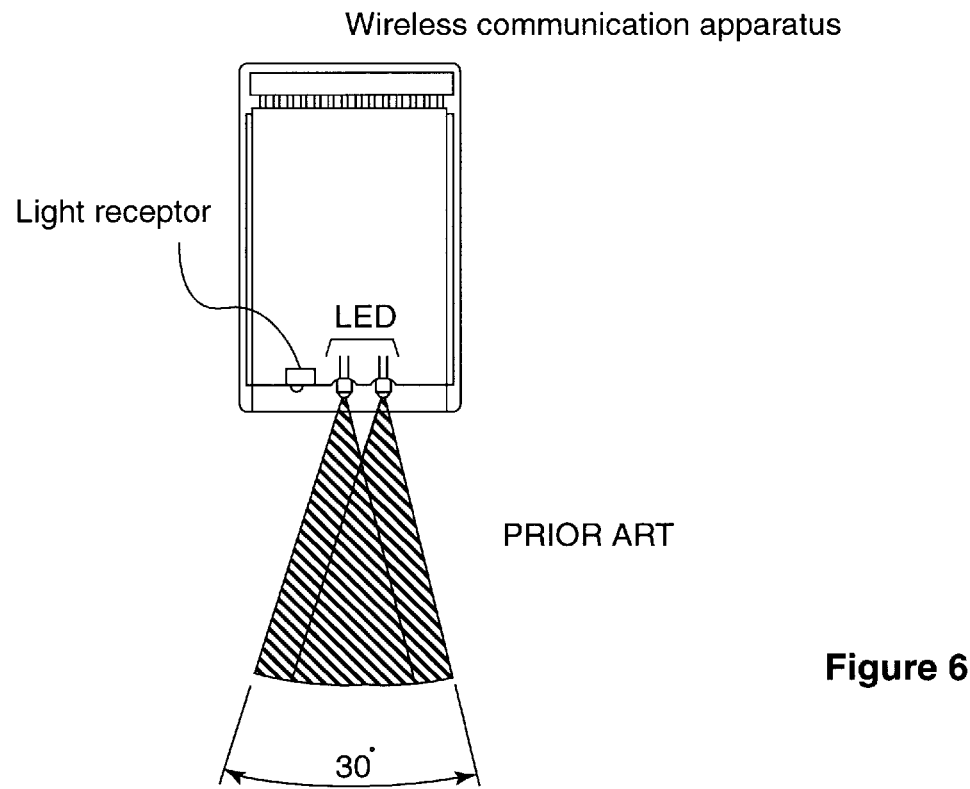
FIG. 6 is a diagram illustrating another conventional wireless communication apparatus.

FIG. 4 is an internal function block diagram of the PC card 10. It should be noted that the data processing, which will be explained while referring to FIG. 4, is the processing that is generally performed with a wireless communication apparatus. For transmission of data from the system 2, data 30 are transmitted via the connector 18 to the PC card 10. In the PC card 10, a logical control mechanism 32 performs a process, such as the addition of a predetermined data structure, for parallel-serial conversion of data and for a communication protocol. Then, digital-analog (D/A) conversion is performed on the data by a converter 34, and the resultant data are amplified by an amplifier 36. With the data on which the above processes are performed, the LED 20, 22, or 24 emits light, and the data are finally transmitted via the filter 12 to a communication partner. For reception of data by the light receptor 26, processing that is the inverse of the transmission data processing is performed. In other words, received data are amplified by the amplifier 36, analog-digital (A/D) conversion is performed on the amplified data by the converter 34, serial-parallel conversion or a conversion into a form that is acceptable by the system 2 is performed on the converted data by the logical control mechanism 32, and the resultant data are transferred via the connector 18 to the system 2.

An operational example of the thus structured wireless communication apparatus (PC card) of the present invention will now be explained while referring to FIGS. 7 through 11.

Figure 7:
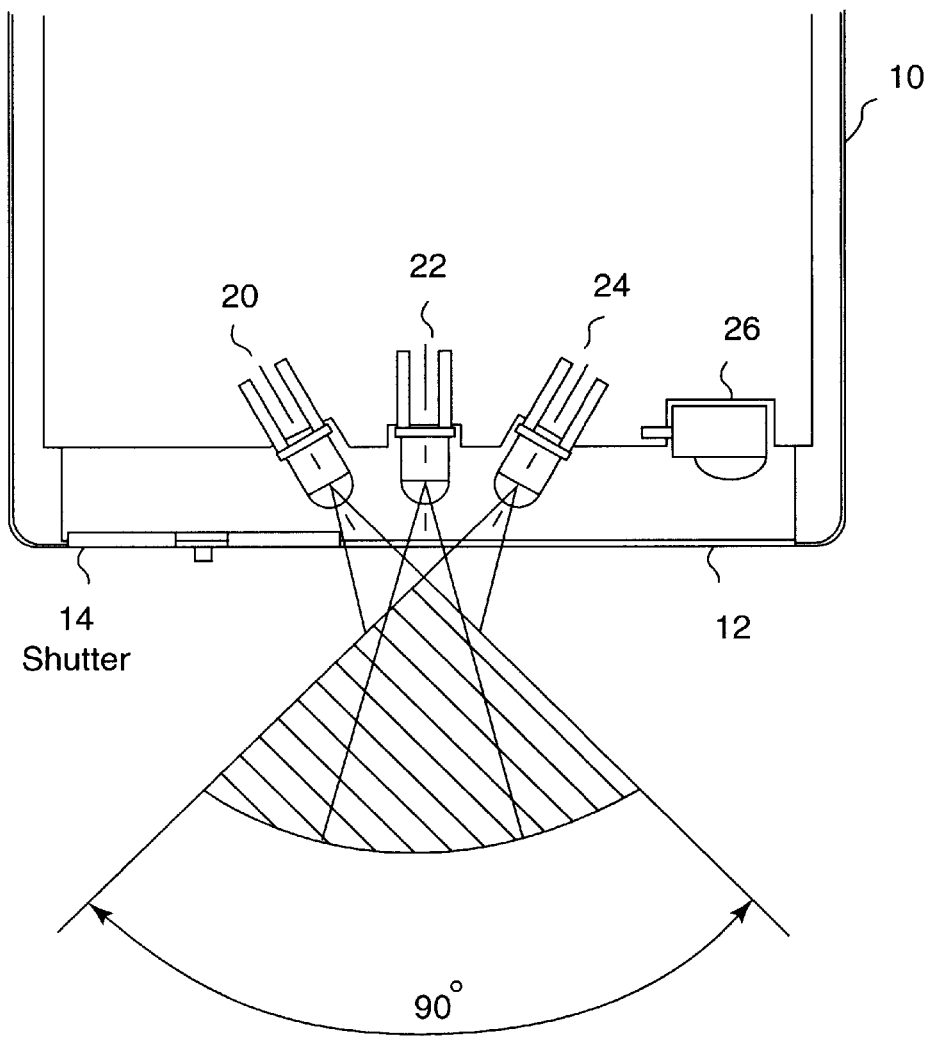
FIG. 7 is a diagram showing an operational example of the PC card 10 when all LEDs are selected.

FIG. 7 is a diagram showing a specific operational example when all the LEDs 20, 22, and 24 are selected at the same time. In FIG. 7, the shutter 14 is moved to a position (left end) where it does not shield any of the LEDs, and infrared data can be transmitted via the three LEDs. As described above, these LEDs 20, 22, and 24 are located at different angles to each other in order to provide the maximum communication range (about 90°), but it should also be noted that they are so arranged that their communication ranges do not overlap each other relative to the face of the filter 12. With this arrangement, when a specific LED is selected, the simultaneous transmission of data via the other LEDs can be prevented (see FIGS. 8 through 11).

Figure 8:
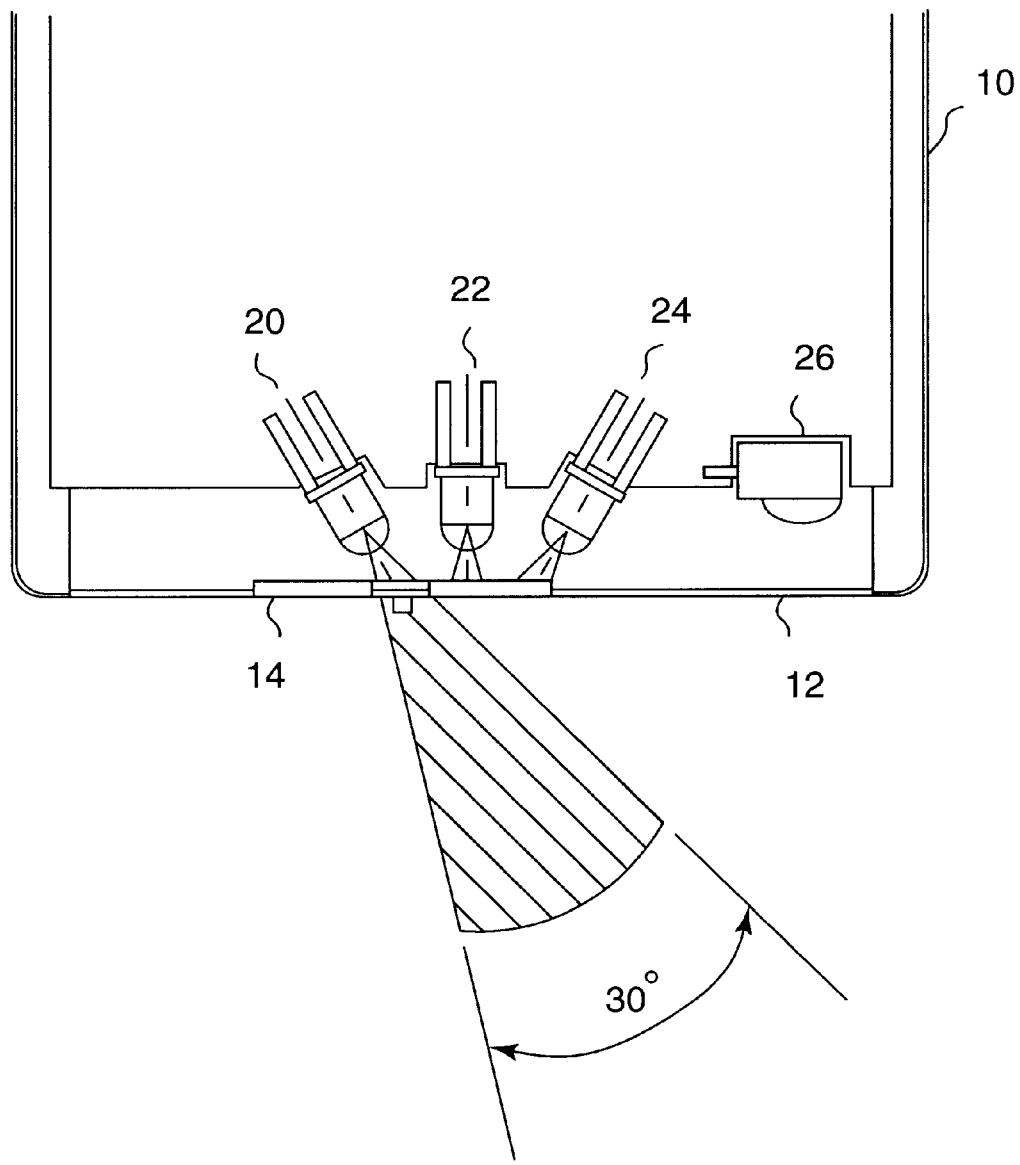
FIG. 8 is a diagram showing an operational example of the PC card 10 when LED 20 is selected.

In FIG. 8 is shown an example where only the LED 20 is selected. The shutter 14 is shifted to the right to a position where it selects only the LED 20. As is described above, since the communication ranges for the LEDs do not overlap each other relative to the filter 12, infrared data that are transmitted via the LEDs 22 and 24 are absolutely intercepted by the shutter 14, and only data that are output via the LED 20 are transmitted. For a mechanism that can usually perform communication across a broad range, as is shown in FIG. 7, data may be transmitted to a third party other than a desired communication partner, and a problem with security or with the erroneous operation of a device may occur. The employment of the mechanism that can select a specific LED is necessary to prevent such a problem. It is preferable that a predetermined index (mark) be provided on the external surface of the PC card 10, or the shutter 14 should be so structurally arranged that it can be moved only to certain positions (not illustrated), in order that a shutter position for the selection of a desired LED can be determined from the outside.

Figure 9:
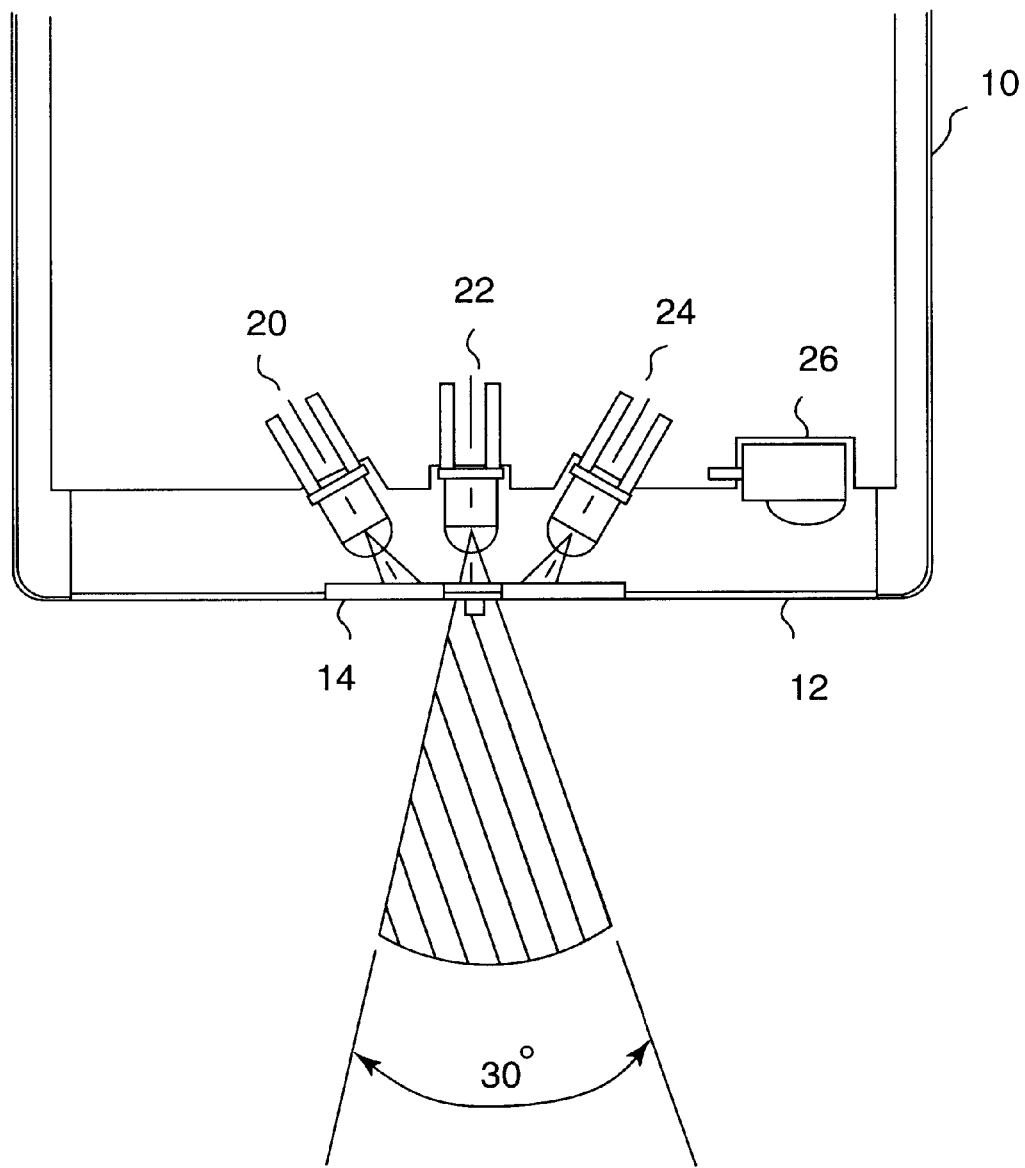
FIG. 9 is a diagram showing an operational example of the PC card 10 when LED 22 is selected.

In FIG. 9 is shown an example where only the LED 22 is selected. The shutter 14 is shifted further to the right to a position where only the LED 22 is selected. As is apparent from FIG. 9, infrared data that are transmitted via the LEDs 20 and 24 are absolutely intercepted by the shutter 14, and only data that are output via the LED 22 are transmitted.

Figure 10:
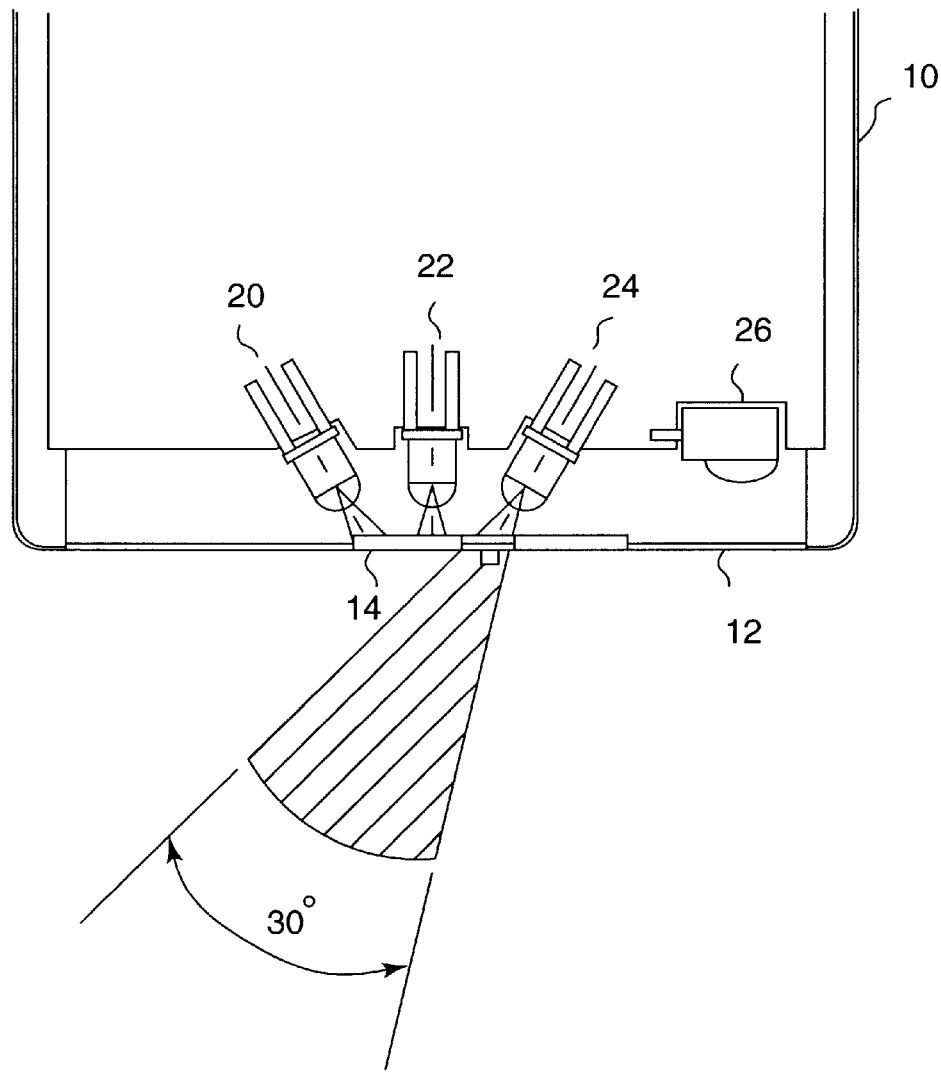
FIG. 10 is a diagram showing an operational example of the PC card 10 when LED 24 is selected.

In FIG. 10 is shown an example where only the LED 24 is selected. The shutter 14 is shifted to the rightmost position where only the LED 24 is selected. As is apparent from FIG. 10, infrared data that are transmitted via the LEDs 20 and 22 are absolutely intercepted by the shutter 14 and only data that are output via the LED 24 are transmitted.

Figure 11:
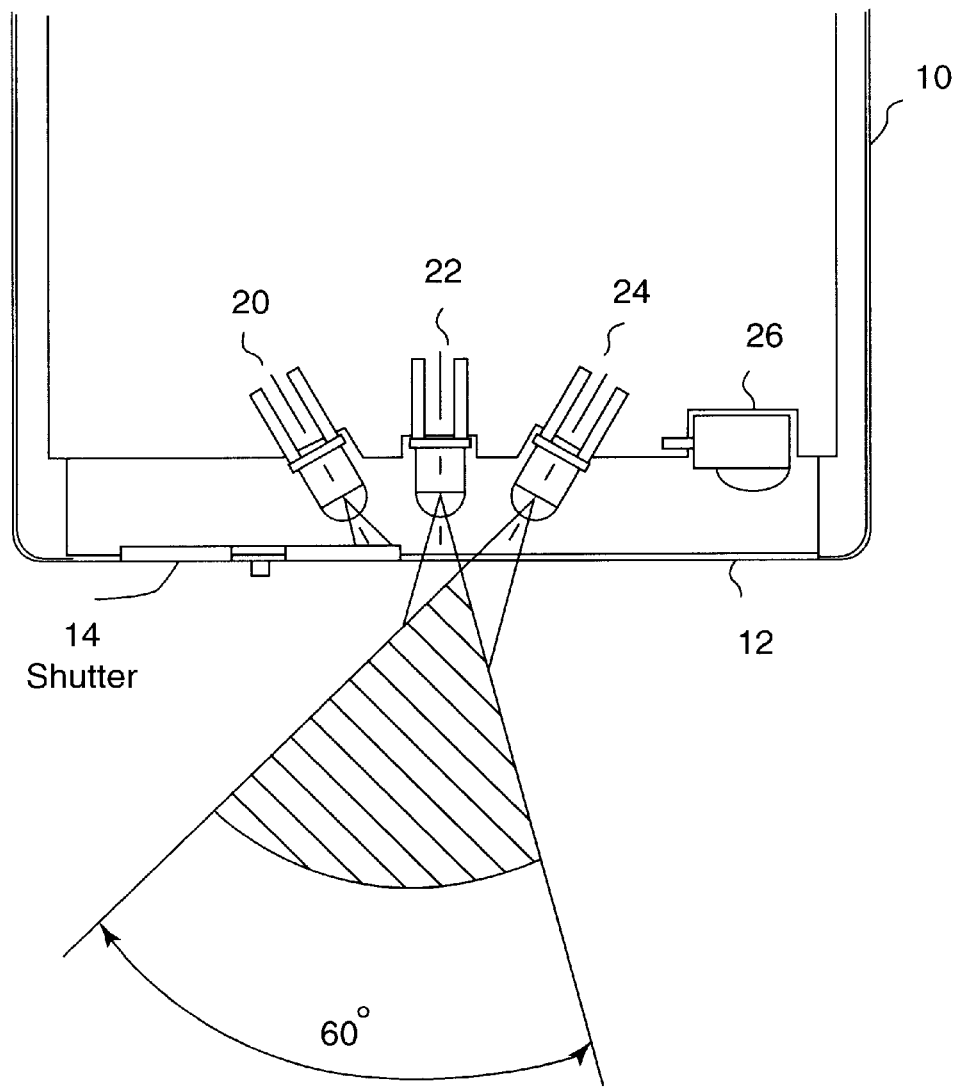
FIG. 11 is a diagram showing an operational example of the PC card 10 when the LEDs 22 and 24 are selected at the same time.

Two of the LEDs can be selected at the same time. This state is shown in FIG. 11. In FIG. 11 is shown an example where the LEDs 22 and 24 are selected at the same time. As is apparent from FIG. 11, only infrared data that are transmitted via the LED 20 are intercepted by the shutter 14, and data that are output via both the LEDs 22 and 24 are transmitted. The communication range is therefore approximately 60°. Although an example is not shown, the LEDs 20 and 22 can be selected at the same time. It should be noted that in this case also the shutter 14 does not shield the light receptor 26.

Figure 12:
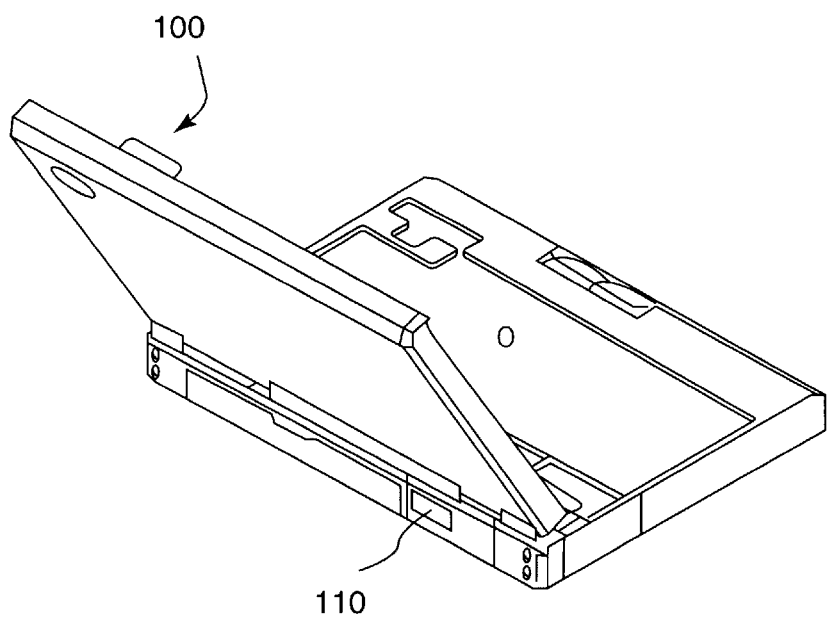
FIG. 12 is a diagram illustrating another computer system for carrying out the present invention.

The present invention has been explained while employing, as an example, a wireless communication apparatus that can be an expansion apparatus having the form of the PC card 10. A wireless communication apparatus of a type that is incorporated in a system is also possible. FIG. 12 is a diagram illustrating such an example. A computer system 100 differs from the computer system 1 in FIG. 1 only in that the system 100 incorporates a wireless communication apparatus 110. The structure and the operations of the wireless communication apparatus 110 are the same as those of the above described wireless communication apparatus (PC card) 10.

Although in the explanation it is stated that the shutter 14 of the present invention can be positioned manually, it may also be positioned electrically, or may be so arranged that it can be either fully opened or closed. To constantly select and use all of the LEDs, a shutter 14 that is so designed as to be detachable is very effective. Further, it is possible for the output hole 15 in the shutter 14 to be so formed that it permits the selection of an arbitrary number of LEDs instead of a single arbitrary LED, or for a shutter mechanism to be provided that does not have an output hole 15. The LEDs may be located outward instead of inward, as in the present embodiment, but it is also important with such an arrangement that the light receptor not be shielded by the shutter. The selection of the LEDs can be performed by an electrical means instead of a physical means, such as the shutter 14.

As is described above, with the arrangement of the present invention, the direction for wireless communication can be easily set by using a shutter mechanism, and communication across a broad range can thus be performed without reducing the light emission output. Since the present invention is realized by the employment of a comparatively simple structure, design changes for hardware and software can be kept to the minimum.

What is claimed is:

1. An infrared transceiver, comprising:

a light receptor;

a plurality of light-emitting diodes located at different output angles with respect to one another; and a moveable shutter having an aperture wherein the shutter is positioned such that the aperture transmits light from any of the plurality of light-emitting diodes, without preventing infrared light from an outside source from being received by the light receptor.

2. The infrared transceiver according to claim 1 wherein the moveable shutter is positioned such that infrared light from at least two diodes is transmitted.

3. The infrared transceiver according to claim 2 wherein the movable shutter is removable and when removed infrared light from all diodes is transmitted.

4. The infrared transceiver according to claim 2 further comprising:

a transparent infrared filter, wherein the infrared light from the emitting diodes do not overlap each other relative to the transparent filter.

5. The infrared transceiver according to claim 2, wherein the moveable shutter is positioned such that infrared light from only two diodes is transmitted.

6. The infrared transceiver according to claim 1 wherein the movable shutter is removable and when removed infrared light from all diodes is transmitted.

7. The infrared transceiver according to claim 1 which is provided as a component of a detachable card.

8. The infrared transceiver according to claim 7 where the detachable card conforms to the Personal Computer Memory Card International Association (PCMCIA) standard.

9. The infrared transceiver according to claim 1 which is incorporated into a data processing system.

10. The infrared transceiver according to claim 1 further comprising:

a transparent infrared filter, wherein the infrared light from the emitting diodes do not overlap each other relative to the transparent filter.

11. The infrared transceiver according to claim 1, wherein the aperture in the moveable shutter permits transmission of the light from any one or more of the plurality of light-emitting diodes.

12. The infrared transceiver according to claim 1, wherein the plurality of light-emitting diodes each transmit the same information.

13. The infrared transceiver according to claim 12, wherein the plurality of light-emitting diodes simultaneously transmit the information.

14. The infrared transceiver according to claim 1, wherein the light-emitting diodes each comprise an infrared diode transmitting digital data.

* * * * *